United States Patent Office 3,514,455
Patented May 26, 1970

3,514,455
1,3,4-THIADIAZINES AND PRODUCTION THEREOF
Akira Takamizawa, Ibaraki-shi, and Hisao Sato, Takatsuki-shi, Japan, assignors to Shionogi & Co., Ltd., Osaka, Japan
No Drawing. Filed May 17, 1968, Ser. No. 729,898
Claims priority, application Japan, May 17, 1967, 42/31,299; Sept. 26, 1967, 42/61,863, 42/61,864
Int. Cl. C07d 93/22
U.S. Cl. 260—243                                   13 Claims

ABSTRACT OF THE DISCLOSURE 1,3,4-thiadiazine derivatives, produced by reacting a 1,3,4-thiadiazolium compound with a phosphorus compound in the presence of an organic or an inorganic base, have medicinal activities including antipyretic, analgesic, anti-inflammatory and anti-edema properties, and are also useful intermediates.

The invention relates to 1,3,4-thiadiazine derivatives. More particularly, it relates to novel 5,6-dihydro-4H-1,3,4-thiadiazin-5-ones. It relates further to a process for their production.

The novel 5,6-dihydro-4H-1,3,4-thiadiazin-5-ones can be illustrated by the following general formula:

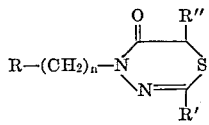

(I)

wherein each of R, R' and R'' is H, lower alkyl (e.g. methyl, ethyl, propyl, isopropyl, butyl), lower alkenyl (e.g. vinyl, allyl, butenyl, isobutenyl, pentenyl, cyclohexenyl), aryl (e.g. phenyl, tolyl, xylyl), phenyl-(lower)-alkyl (e.g. benzyl, phenethyl, phenylpropyl), a heterocyclic group (e.g. furanyl, pyranyl, thiophenyl, thiazolyl, thiazinyl, imidazolyl, pyridyl, pyrimidyl), and wherein R, R' and R'' may be substituted by 1 to 3 substituents such as lower alkyl (e.g. methyl, ethyl, propyl, isopropyl, butyl), lower alkoxy (e.g. methoxy, ethoxy, propoxy, isopropoxy, butoxy), hydroxy, amino or halogen (e.g. chlorine, bromine, iodine) and $n$ is an integer from 0 to 5.

The present invention is based on the possibility, hitherto unknown that, a 1,3,4-thiadiazole can be converted to a 1,3,4-thiadizine by enlargement of the thiadiazole ring with a phosphorus compound. According to a further aspect of the invention, the products obtained by this novel unique type reaction are useful as medicaments and as intermediates therefor.

Accordingly, an object of the present invention is to produce the aforesaid novel 5,6-dihydro-4H-1,3,4-thiadiazin-5-one derivatives. Another object of the invention is to produce 5,6-dihydro-4H-1,3,4-thiadiazin-5-one derivatives showing antipyretic, analgesic, anti-inflammatory and anti-edema activities. A further object of the invention is to embody a novel process for the production of the said 5,6-dihydro-4H-1,3,4-thiadiazin-5-one derivatives. These and other objects and the manner in which they are accomplished will become apparent to those conversant with the art from the following description of the general class of compounds and certain specific examples of particular members as well as of the general and specific methods for their production.

According to the present invention, an objective 5,6-dihydro-4H-1,3,4-thiadiazin-5-one (I) can be produced by reacting a 1,3,4-thiadiazolium compound of the formula:

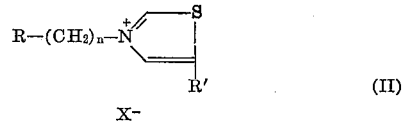

(II)

wherein R, R' and $n$ each has the same significance as designated above X is an acid radical residue (e.g. chlorine, bromine, iodine), with a phosphorus compound represented by one of the following formulae:

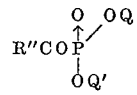

and

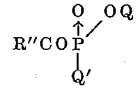

wherein R'' has the same significance as designated above, and Q and Q' are each lower alkyl (e.g. methyl, ethyl, propyl, isopropyl, butyl), aryl (e.g. phenyl, tolyl, xylyl) or phenyl-(lower)-alkyl (e.g. benzyl, phenethyl, phenylpropyl), in the presence of an organic or an inorganic base in an inert solvent at a temperature ranging from −100 to 40° C., advantageously under cooling.

Examples of the starting material, namely 1,3,4-thiadiazolium compound (II), include:
3-methyl-1,3,4-thiadiazol-3-ium chloride,
3-methyl-1,3,4-thiadiazol-3-ium bromide,
3-methyl-1,3,4-thiadiazol-3-ium iodide,
3-ethyl-1,3,4-thiadiazol-3-ium chloride,
3-ethyl-1,3,4-thiadiazol-3-ium bromide,
3-ethyl-1,3,4-thiadiazol-3-ium iodide,
3-propyl-1,3,4-thiadiazol-3-ium chloride,
3-propyl-1,3,4-thiadiazol-3-ium iodide,
3-propyl-1,3,4-thiadiazol-3-ium bromide,
3-isopropyl-1,3,4-thiadiazol-3-ium chloride,
3-pentyl-1,3,4-thiadiazol-3-ium chloride,
3-allyl-1,3,4-thiadiazol-3-ium chloride,
3-allyl-1,3,4-thiadiazol-3-ium bromide,
3-allyl-1,3,4-thiadiazol-3-ium iodide,
3-butenyl-1,3,4-thiadiazol-3-ium chloride,
3-pentenyl-1,3,4-thiadiazol-3-ium chloride,
3-cyclohexenyl-1,3,4-thiadiazol-3-ium chloride,
3-phenyl-1,3,4-thiadiazol-3-ium chloride,
3-phenyl-1,3,4-thiadiazol-3-ium bromide,
3-tolyl-1,3,4-thiadiazol-3-ium chloride,
3-benzyl-1,3,4-thiadiazol-3-ium chloride,
3-benzyl-1,3,4-thiadiazol-3-ium iodide,
3-phenethyl-1,3,4-thiadiazol-3-ium chloride,
3-phenethyl-1,3,4-thiadiazol-3-ium bromide,
3-(3-phenylpropyl)-1,3,4-thiadiazol-3-ium chloride,
3-(2-methyl-4-aminopyrimidin-5-ylmethyl)-1,3,4-thiadiazol-3-ium chloride hydrochloride,
3-(2-methyl-4-aminopyrimidin-5-ylmethyl)-1,3,4-thiadiazol-3-ium bromide hydrobromide,
3-(2-methyl-4-aminopyrimidin-5-ylmethyl)-1,3,4-thiadiazol-3-ium iodide hydroiodide,
3-(fur-2-ylmethyl)-1,3,4-thiadiazol-3-ium chloride,
3-(thiazol-2-ylmethyl)-1,3,4-thiadiazol-3-ium chloride,
3-methyl-5-phenyl-1,3,4-thiadiazol-3-ium chloride,
3-methyl-5-phenyl-1,3,4-thiadiazol-3-ium bromide,
3-methyl-5-phenyl-1,3,4-thiadiazol-3-ium iodide,
3-ethyl-5-phenyl-1,3,4-thiadiazol-3-ium chloride,
3-ethyl-5-phenyl-1,3,4-thiadiazol-3-ium bromide,
3-propyl-5-phenyl-1,3,4-thiadiazol-3-ium chloride,
3-isopropyl-5-phenyl-1,3,4-thiadiazol-3-ium chloride,
3-butyl-5-phenyl-1,3,4-thiadiazol-3-ium chloride, 3-methyl-5-(4-methylphenyl)-1,3,4-thiadiazol-3-ium chloride,
3-methyl-5-(4-propylphenyl)-1,3,4-thiadiazol-3-ium bromide,
3-ethyl-5-(4-methoxyphenyl)-1,3,4-thiadiazol-3-ium chloride,
3-ethyl-5-(4-ethoxyphenyl)-1,3,4-thiadiazol-3-ium chloride,
3-methyl-5-(4-hydroxyphenyl)-1,3,4-thiadiazol-3-ium chloride,
3-ethyl-5-(4-aminophenyl)-1,3,4-thiadiazol-3-ium chloride,
3-ethyl-5-(4-chlorophenyl)-1,3,4-thiadiazol-3-ium bromide,
3-propyl-5-(4-bromophenyl)-1,3,4-thiadiazol-3-ium chloride,
3-allyl-5-phenyl-1,3,4-thiadiazol-3-ium chloride,
3-allyl-5-(4-methoxyphenyl)-1,3,4-thiadiazol-3-ium chloride,
3-butenyl-5-phenyl-1,3,4-thiadiazol-3-ium chloride,
3-benzyl-5-phenyl-1,3,4-thiadiazol-3-ium chloride,
3-benzyl-5-phenyl-1,3,4-thiadiazol-3-ium bromide,
3-benzyl-5-phenyl-1,3,4-thiadiazol-3-ium iodide,
3-(3-phenylpropyl)-5-phenyl-1,3,4-thiadiazol-3-ium chloride,
3-(2-methyl-4-amino-pyrimidin-5-ylmethyl)-5-phenyl-1,3,4-thiadiazol-3-ium chloride hydrochloride,
3-(2-methyl-4-aminopyrimidin-5-ylmethyl)-5-phenyl-1,3,4-thiadiazol-3-ium bromide hydrobromide,
3-(2-methyl-4-aminopyrimidin-5-ylmethyl)-5-phenyl-1,3,4-thiadiazol-3-ium iodide hydroiodide,
3-(2-methyl-4-aminopyrimidin-5-ylmethyl)-5-(4-methylphenyl)-1,3,4-thiadiazol-3-ium chloride,
3-(2-methyl-4-aminopyrimidin-5-ylmethyl)-5-(4-aminophenyl)-1,3,4-thiadiazol-3-ium chloride,
3-(2-methyl-4-aminopyrimidin-5-ylmethyl)-5-(4-methoxyphenyl)-1,3,4-thiadiazol-3-ium chloride,
3-(2-methyl-4-aminopyrimidin-5-ylmethyl)-5-(4-chlorophenyl)-1,3,4-thiadiazol-3-ium chloride,
3-(2-methyl-4-aminopyrimidin-5-ylmethyl)-5-(4-chlorophenyl)-1,3,4-thiadiazol-3-ium bromide,
3-(2-methyl-4-aminopyrimidin-5-ylmethyl)-5-(4-bromophenyl)-1,3,4-thiadiazol-3-ium chloride,
3-(thiazol-2-ylmethyl)-1,3,4-thiadiazol-3-ium bromide, and
3-(imidazol-4-ylmethyl)-1,3,4-thiadiazol-3-ium bromide.

These starting materials can be prepared, for example, by a condensation of a corresponding halogen compound with a desired 2-substituted or unsubstituted 1,3,4-thiadiazol, the latter being synthesized by a per se known method (e.g. B. Fohlisch et al.: Angew, Chem. Internat. Edit., 6, 361 (1967)).

As examples of phosphorus compounds, there can be exemplified: dimethyl acetylphosphonate, diethyl acetylphosphonate, dimethylbutyrylphosphonate, diethyl butyrylphosphonate, dimethyl acryloylphosphonate, diethyl acryloylphosphonate, dimethyl 3-butenoylphosphonate, dimethyl benzoylphosphonate, diethyl benzoylphosphonate, dipropyl benzoylphosphonate, dimethyl xyloylphosphonate, diethyl toluoylphosphonate, diethyl 4-chloro-benzoylphosphonate, dimethyl phenylacetylphosphonate, diethyl phenylacetylphosphonate, dimethyl phenylpropionylphosphonate, diethyl phenylpropionylphosphonate, methyl acetyl-P-phenylphosphinate, ethyl acetyl-P-phenylphosphinate, propyl acetyl-P-phenylphosphinate, butyl acetyl-P-phenylphosphinate, methyl acryloyl-P-methylphosphinate, ethyl acryloyl-P-ethylphosphinate, methyl 3-butenoyl-P-ethylphosphinate, methyl benzoyl-P-phenylphosphinate, ethyl benzoyl-P-phenylphosphinate, methyl phenylacetyl - P - phenylphosphinate, ethyl phenylpropionyl-P-phenylphosphinate, etc.

As the bases employed in the present invention, organic or inorganic bases can be used. These can be specifically exemplified as follows: alkali metal alkoxides, such as sodium ethoxide, alkaline earth metal alkoxides, alkali metal hydroxides, such as sodium hydroxides, alkaline earth metal hydroxides, alkali metal carbonates, such as sodium carbonate, alkaline earth metal carbonates, alkali metal bicarbonates, alkaline earth metal bicarbonates, alkali metal carboxylates, alkaline earth metal carboxylates, alkyl amines such as diethylamine, triethylamine, dipropylamine, diethylpropylamine or dibutylamine, pyridine bases such as pyridine, picoline, lutidine or collidine, or the like.

The present process is carried out in an inert solvent such as alkanol (e.g. methanol, ethanol, propanol), a halogenoalkane (e.g. methylenechloride, chloroform, trichloroethane), an ether (e.g. diethyl ether, tetrahydrofuran, dioxane), acetone, ethyl acetate, dimethylformamide, benzene, toluene or a mixture thereof.

The present process is carried out at a temperature of from −100 to 40° C., advantageously under cooling, because the reaction takes place in general exothermically.

Specific examples of the 1,3,4-thiadiazines (I) thus prepared by the process of the present invention are:

4-methyl-6-phenyl-5,6-dihydro-4H-1,3,4-thiadiazin-5-one,
4-ethyl-6-phenyl-5,6-dihydro-4H-1,3,4-thiadiazin-5-one,
4-propyl-6-phenyl-5,6-dihydro-4H-1,3,4-thiadiazin-5-one,
4-isopropyl-6-phenyl-5,6-dihydro-4H-1,3,4-thiadiazin-5-one,
4-butyl-6-phenyl-5,6-dihydro-4H-1,3,4-thiadiazin-5-one,
4-pentyl-6-phenyl-5,6-dihydro-4H-1,3,4-thiadiazin-5-one,
4-allyl-6-phenyl-5,6-dihydro-4H-1,3,4-thiadiazin-5-one,
4-butenyl-6-phenyl-5,6-dihydro-4H-1,3,4-thiadiazin-5-one,
4-pentenyl-6-phenyl-5,6-dihydro-4H-1,3,4-thiadiazin-5-one,
4-cyclohexenyl-6-phenyl-5,6-dihydro-4H-1,3,4-thiadiazin-5-one,
4,6-diphenyl-5,6-dihydro-4H-1,3,4-thiadiazin-5-one,
4-(4-chlorophenyl)-6-phenyl-5,6-dihydro-4H-1,3,4-thiadiazin-5-one,
4-(4-methoxyphenyl)-6-phenyl-5,6-dihydro-4H-1,3,4-thiadiazin-5-one,
4-(4-methylphenyl)-6-phenyl-5,6-dihydro-4H-1,3,4-thiadiazin-5-one,
4-(4-aminophenyl)-6-phenyl-5,6-dihydro-4H-1,3,4-thiadiazin-5-one,
4-(4-hydroxyphenyl)-6-phenyl-5,6-dihydro-4H-1,3,4-thiadiazin-5-one,
4-benzyl-6-phenyl-5,6-dihydro-4H-1,3,4-thiadiazin-5-one,
4-phenethyl-6-phenyl-5,6-dihydro-4H-1,3,4-thiadiazin-5-one,
4-(3-phenylpropyl)-6-phenyl-5,6-dihydro-4H-1,3,4-thiadiazin-5-one,
4-(2-methyl-4-aminopyrimidin-5-ylmethyl)-6-phenyl-5,6-dihydro-4H-1,3,4-thiadiazin-5-one,
4-(fur-2-ylmethyl)-6-phenyl-5,6-dihydro-4H-1,3,4-thiadiazin-5-one,
4-(thiazol-2-ylmethyl)-6-phenyl-5,6-dihydro-4H-1,3,4-thiadiazin-5-one,
4-methyl-2,6-diphenyl-5,6-dihydro-4H-1,3,4-thiadiazin-5-one,
4-ethyl-2,6-diphenyl-5,6-dihydro-4H-1,3,4-thiadiazin-5-one,
4-propyl-2,6-diphenyl-5,6-dihydro-4H-1,3,4-thiadiazin-5-one,
4-isopropyl-2,6-diphenyl-5,6-dihydro-4H-1,3,4-thiadiazin-5-one,
4-butyl-2,6-diphenyl-5,6-dihydro-4H-1,3,4-thiadiazin-5-one,
4-allyl-2,6-diphenyl-5,6-dihydro-4H-1,3,4-thiadiazin-5-one,
4-butenyl-2,6-diphenyl-5,6-dihydro-4H-1,3,4-thiadiazin-5-one,
2,4,6-triphenyl-5,6-dihydro-4H-1,3,4-thiadiazin-5-one,
2-phenyl-4-benzyl-6-(4-chlorophenyl)-5,6-dihydro-4H-1,3,4-thiadiazin-5-one,
2-phenyl-4-benzyl-6-(4-methylphenyl)-5,6-dihydro-4H-1,3,4-thiadiazin-5-one, 2-(4-chlorophenyl)-4-benzyl-6-phenyl-5,6-dihydro-4H-1,3,4-thiadiazin-5-one,
2-(4-methoxyphenyl)-4-benzyl-6-phenyl-5,6-dihydro-4H-1,3,4-thiadiazin-5-one,
4-benzyl-di(chlorophenyl)-5,6-dihydro-4H-1,3,4-thiadiazin-5-one,
2,6-diphenyl-4-(2-methyl-4-aminopyrimidin-5-ylmethyl) 5,6-dihydro-4H-1,3,4-thiadiazin-5-one,
4-(fur-2-ylmethyl)-6-phenyl-5,6-dihydro-4H-1,3,4-thiadiazin-5-one,
2-phenyl-4,6-dimethyl-5,6-dihydro-4H-1,3,4-thiadiazin-5-one,
2-phenyl-4-methyl-6-ethyl-5,6-dihydro-4H-1,3,4-thiadiazin-5-one,
2-phenyl-4,6-diethyl-5,6-dihydro-4H-1,3,4-thiadiazin-5-one,
2-phenyl-4-propyl-6-methyl-5,6-dihydro-4H-1,3,4-thiadiazin-5-one,
2-phenyl-4-isopropyl-6-butyl-5,6-dihydro-4H-1,3,4-thiadiazin-5-one,
2-(4-methylphenyl)-4-methyl-6-ethyl-5,6-dihydro-4H-1,3,4-thiadiazin-5-one,
2-(4-chlorophenyl)-4-ethyl-6-methyl-5,6-dihydro-4H-1,3,4-thiadiazin-5-one,
2-phenyl-4-allyl-6-methyl-5,6-dihydro-4H-1,3,4-thiadiazin-5-one,
2-phenyl-4-butenyl-6-methyl-5,6-dihydro-4H-1,3,4-thiadiazin-5-one,
2-phenyl-4-benzyl-6-methyl-5,6-dihydro-4H-1,3,4-thiadiazin-5-one,
2-(4-methylphenyl)-4,6-dibenzyl-5,6-dihydro-4H-1,3,4-thiadiazin-5-one,
2-(4-ethylphenyl)-4,6-dibenzyl-5,6-dihydro-4H-1,3,4-thiadiazin-5-one,
2-(4-propylphenyl)-4,6-dibenzyl-5,6-dihydro-4H-1,3,4-thiadiazin-5-one,
2-(4-chlorophenyl)-4,6-dibenzyl-5,6-dihydro-4H-1,3,4-thiadiazin-5-one,
2-(4-iodophenyl)-4-benzyl-6-vinyl-5,6-dihydro-4H-1,3,4-thiadiazin-5-one,
2-(4-aminophenyl)-4-benzyl-6-phenethyl-5,6-dihydro-4H-1,3,4-thiadiazin-5-one,
2-(4-hydroxyphenyl)-4-benzyl-6-xylyl-5,6-dihydro-4H-1,3,4-thiadiazin-5-one,
2-(4-ethoxyphenyl)-4-benzyl-6-methyl-5,6-dihydro-4H-1,3,4-thiadiazin-5-one,
2-(4-propoxyphenyl)-4-benzyl-6-ethyl-5,6-dihydro-4H-1,3,4-thiadiazin-5-one,
2-phenyl-4-phenethyl-6-ethyl-5,6-dihydro-4H-1,3,4-thiadiazin-5-one,
2-phenyl-4-(2-methyl-4-amonopyrimidin-5-ylmethyl)-6-methyl-5,6-dihydro-4H-1,3,4-thiadiazin-5-one, and
2,4-di(2-methyl-4-aminopyrimidin-5-ylmethyl)-6-methyl-5,6-dihydro-4H-1,3,4-thiadiazin-5-one.

The thus produced 1,3,4-thiadiazines show anti-pyretic, analgesic, anti-inflammatory and anti-edema activities and are useful as medicaments. For example, 4-(2-methyl-4-aminopyrimidin-5-ylmethyl) - 6 - phenyl-5,6-dihydro-4H-1,3,4-thiadiazin-5-one (50 mg.) shows 31.3% inhibition of the edema caused by carrageenin in the Winstar rat when orally administered. Further, the median lethal dose ($LD_{50}$) of 4-(2-methyl-4-amino-pyrimidin-5-ylmethyl)-5,6-dihydro-4H-1,3,4-thiadiazin-5-one is determined to be less than 800 mg./kg. in mice subcutaneously. The other compounds produced by the present invention also have the said activities and are likewise useful as medicaments. They can be administered in a variety of per se conventional ways, e.g. in the form of tablets constituted e.g. by an effective single dose of an active compound of the invention and a major proportion of a per se conventional carrier.

Thus, in the treatment of a human adult for the alleviation of rheumatism from which he suffers, the oral administration in single dosage form of 1 to 200 mg./kg. of a compound I according to this invention is indicated, with repetition from time to time as required.

The following examples illustrate methods of carrying out the present invention, but it is to be understood that these examples are given for purpose of illustration only and not of limitation. In the examples which follow, parts by weight bear the same relation to parts by volume as do grams to milliliters. The temperatures are set forth in degrees centigrade. By "room temperature" is meant 15° to 30° C.

EXAMPLE 1

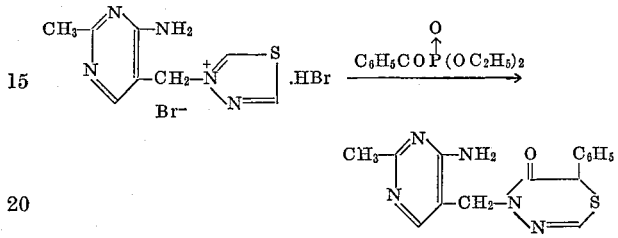

To a mixture of 3-(2-methyl-4-aminopyrimidin-5-ylmethyl)-1,3,4-thiadiazol-3-ium bromide hydrobromide (50 parts by weight), diethyl benzoylphosphonate (33 parts by weight) and anhydrous dimethylformamide (350 parts by volume) is added pyridine (32.5 parts by weight) (dried over potassium hydroxide) while stirring in nitrogen stream at 1 to 2° C. The mixture is stirred for 20 minutes at the same temperature, for 3 hours at room temperature and allowed to stand overnight at room temperature. After an additional stirring is continued for 32 hours, the mixture is allowed to stand for 5 days at room temperature and the stirring is continued for further 24 hours. The solvent is removed under reduced pressure below —42° C. The residue is treated with chloroform and precipitated substances (mainly the starting material) are removed by filtration. The filtrate is washed with sodium bicarbonate and water successively, dried over anhydrous sodium sulfate and concentrated under reduced pressure. The oily residue is taken up in ether and left overnight at a cold place. The crystals precipitated are collected by filtration and recrystallized from ethanol containing a small amount of water to give 4-(2-methyl-4-aminopyrimidin-5-ylmethyl) - 6 - phenyl-5,6-dihydro-4H-1,3,4-thiadiazin-5-one (15.6 parts by weight) as colorless pillars, melting at 147 to 149° C.

The ethereal mother liquor is chromatographed on alumina and the eluate with ethyl acetate gives the same product (2.3 parts by weight).

Analysis.—Calcd. for $C_{15}H_{15}N_5OS$ (percent): C, 57.50; H, 4.83; N, 22.34; S, 10.20. Found (percent): C, 57.17; H, 4.91; N, 22.23; S, 10.25.

EXAMPLE 2

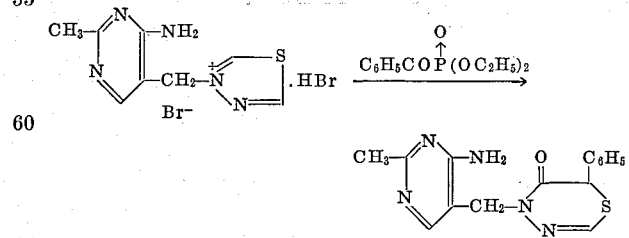

To a mixture of 3-(2-methyl-4-aminopyrimidin-5-ylmethyl)-1,3,4-thiadiazol-3-ium bromide hydrobromide (30 parts by weight), diethyl benzoylphosphonate (20 parts by weight) and anhydrous dimethylformamide (200 parts by volume) is added triethylamine (dried over sodium) while stirring at —65 to —60° C. The mixture is stirred for 2.5 hours at the same temperature, allowed to stand overnight at —65 to 0° C. and further stirred for 8 hours at —65 to —60° C. After allowing the mixture to stand overnight at —65 to 0° C., the solvent is removed under reduced pressure below 43° C. and the residue is extracted with chloroform. The chloroform extract is washed with sodium bicarbonate and water successively, dried over anhydrous sodium sulfate and concentrated under reduced pressure to give an oily residue. The oily residue is chromatographed on alumina and eluted with ethyl acetate to give crude crystals, which are recrystallized from ethanol to give 4-(2-methyl-4-aminopyrimidin-5-ylmethyl)-6-phenyl - 5,6 - dihydro-4H-1,3,4-thiadiazin-5-one (14 parts by weight) as colorless pillars, melting at 147 to 149° C.

EXAMPLE 3

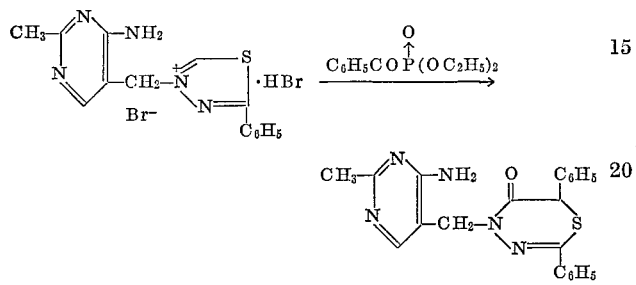

To a mixture of 3-(2-methyl-4-aminopyrimidin-5-yl-methyl)-5-phenyl-1,3,4-thiadiazol-3-ium bromide hydrobromide (30 parts by weight), diethyl benzoylphosphonate (16.5 parts by weight) and anhydrous dimethylformamide (250 parts by volume) is added pyridine (54 parts by weight) (dried over potassium hydroxide) while stirring in nitrogen stream at 2 to 4° C. Stirring is continued for 45 minutes at the same temperature and for 68 hours at room temperature. After supplying pyridine (26 parts by weight), the mixture is stirred for additional 47 hours. The solvent is removed under reduced pressure below 45° C. The residue is treated with chloroform and precipitated substances (mainly the starting material) are removed by filtration. The filtrate is washed with sodium bicarbonate and water successively, dried over anhydrous sodium sulfate and concentrated under reduced pressure. The oily residue is dissolved in a small amount of ether and allowed to stand for 2 days under ice-cooling. The crystals precipitated are collected and recrystallized from ethanol to give 2,6-diphenyl-4-(2-methyl-4-amino-pyrimidin - 5 - ylmethyl)-5,6-dihydro-4H-1,3,4-thiadiazin-5-one (9.4 parts by weight) as pale yellow needles, melting at 205 to 208° C.

*Analysis.*—Calcd. for $C_{21}H_{19}N_5OS$ (percent): C, 64.77; H, 4.92; N, 17.99; S, 8.22. Found (percent): C, 63.90; H, 5.08; N, 18.05; S, 8.42.

EXAMPLE 4

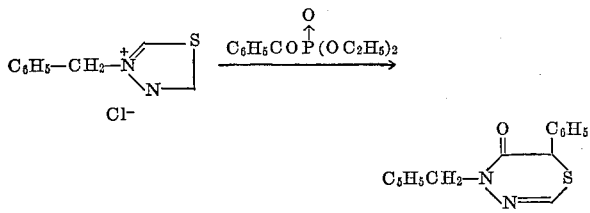

To a mixture of 3-benzyl-1,3,4-thiadiazol-3-ium chloride (30 parts by weight), diethyl benzoylphosphonate (34.5 parts by weight) and anhydrous dimethylformamide (100 parts by volume) is added triethylamine (29 parts by weight) while stirring in nitrogen stream at 1 to 7° C. The mixture is stirred for 40 minutes at the same temperature, for 5 hours at room temperature and allowed to stand overnight. The solvent is removed under reduced pressure below 45° C. and residue is extracted with chloroform. The chloroform extract is washed with sodium bicarbonate and water successively, dried over anhydrous sodium sulfate and concentrated under reduced pressure. The oily residue is chromatographed on alumina and eluted with ethyl acetate to give an oil, which is distilled under reduced pressure to give 4-benzyl-6-phenyl-5,6-dihydro-4H-1,3,4-thiadiazin-5-one (24 parts by weight) as a brown oil, boiling at 140 to 150° C. (0.15 mm. Hg).

IR $\nu_{max.}^{film}$ cm.$^{-1}$: 1656. UV $\lambda_{max.}^{EtOH}$ m$\mu$: 206 (shoulder), 301

NMR ($\tau$, CDCl$_3$): 2.47 $\left(\text{doublet, N=}\begin{array}{c}S\\H\end{array}, J=1.7\right)$, 2.75

(singlet, C$_6$H$_5$), 2.78 (singlet, C$_6$H$_5$), 4.95 (singlet,

—CH$_2$—N), 5.35 $\left(\text{doublet,}\begin{array}{c}C\\S\quad H\end{array}, J=1.7\right)$.

EXAMPLE 5

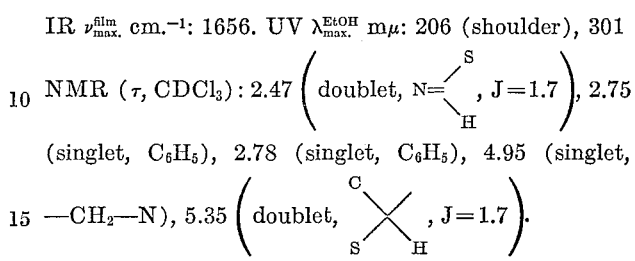

To a mixture of 3-methyl-5-phenyl-1,3,4-thiadiazol-3-ium iodide (46 parts by weight), diethyl benzoylphosphonate (37 parts by weight) and anhydrous dimethylformamide (150 parts by volume) is added triethylamine (31 parts by weight) (dried over sodium) at 1 to 5.5° C., Then, the mixture is stirred for 2 hours below 2° C. in nitrogen stream, allowed to stand for 2 days at room temperature and the solvent is removed under reduced pressure below 45° C. The residue is chromatographed on alumina and eluted with ethyl acetate to give crude crystals, which are recrystallized from aqueous ethanol to give 2,6-diphenyl-4-methyl-5,6-dihydro-4H-1,3,4-thiadiazin-5-one (27 parts by weight) as colorless pillars, melting at 137 to 138° C.

IR $\nu_{max.}^{Nujol}$ cm.$^{-1}$: 1665. UV $\lambda_{max.}^{EtOH}$ m$\mu$: 262, 320

*Analysis.*—Calcd. for $C_{16}H_{14}N_2OS$ (percent): C, 68.07; H, 5.00; N, 9.92; S, 11.33. Found (percent): C, 68.05; H, 4.99; N, 9.93; S, 11.40.

EXAMPLE 6

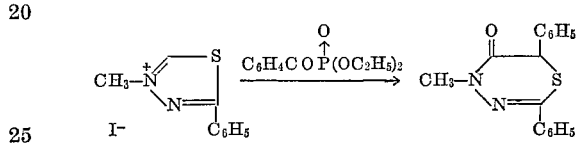

To a mixture of 3-methyl-5-phenyl-1,3,4-thiadiazol-3-ium iodide (24.5 parts by weight), diethyl benzoylphosphonate (15 parts by weight) and anhydrous dimethylformamide (100 parts by volume) is added triethylamine (16.5 parts by weight) (dried over sodium) under ice-cooling and the reaction is carried out in a similar manner to Example 5 to give 2-phenyl-4,6-dimethyl-5,6-dihydro-4H-1,3,4-thiadiazin-5-one (8 parts by weight) as a brownish red oil.

IR $\nu_{max.}^{film}$ cm.$^{-1}$: 1667. NMR ($\tau$, CDCl$_3$): 2.0–2.8 (multiplet, C$_6$H$_5$), 5.95 $\left(\text{quartet,}-\overset{H}{\underset{S}{C}}-, J=7.0\right)$, 6.46 $\Big(\text{singlet,}$ CH$_3$–N$\big\langle$ $\Big)$, 8.52 $\left(\text{doublet,} -\underset{S}{C}-CH_3, J=7.0\right)$.

EXAMPLE 7

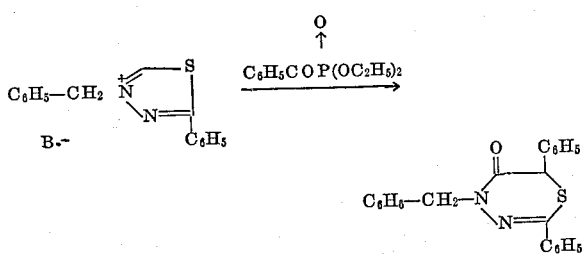

To a mixture of 3-benzyl-5-phenyl-1,3,4-thiadiazol-3-ium bromide (67 parts by weight), diethyl benzoylphosphonate (49 parts by weight) and anhydrous dimethylformamide (220 parts by volume) is added triethylamine (41 parts by weight) (dried over sodium) while stirring in nitrogen stream under ice-cooling. Then, the mixture is stirred for 30 minutes at 0 to 2° C., for 2 hours at room temperature, allowed to stand overnight and concentrated under reduced pressure at 50° C. The residue is dissolved in chloroform, washed with sodium hydroxide and water successively, dried over anhydrous sodium sulfate and the solvent is removed. The residue is purified by alumina chromatography with ethyl acetate to give crystals. Recrystallization from ethanol gives 2,6-diphenyl-4-benzyl-5,6-dihydro-4H-1,3,4-thiadiazin-5-one (40 parts by weight) as colorless fine needles, melting at 115 to 120° C.

IR $\nu_{max}^{Nujol}$ cm.$^{-1}$: 1654. UV $\lambda_{max}^{EtOH}$ m$\mu$: 260,320. NMR ($\tau$, CDCl$_3$): 2.1–2.8 (multiplet, C$_6$H$_5$), 4.83 (singlet, —CH$_2$—), 5.25 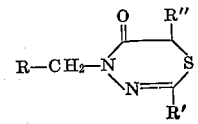

EXAMPLE 8

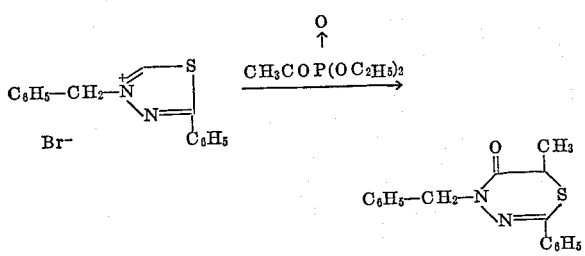

To a mixture of 3-benzyl-5-phenyl-1,3,4-thiadiazol-3-ium bromide (50 parts by weight) diethyl acetylphosphonate (27 parts by weight) and anhydrous dimethylformamide is added triethylamine (31 parts by weight) (dried over sodium) while stirring in nitrogen stream under ice-cooling. The reaction is carried out in a similar manner to Example 7 to give 2-phenyl-4-benzyl-6-methyl-5,6-dihydro-4H-1,3,4-thiadiazin-5-one (21 parts by weight) as a brownish red oil.

IR $\nu_{max}^{film}$ cm.$^{-1}$: 1666. UV $\lambda_{max}^{EtOH}$ m$\mu$: 280,320. NMR ($\tau$, CDCl$_3$): 2.1–2.9 (multiplet, C$_6$H$_5$), 4.90 (singlet, —CH$_2$—), 6.43 (quartet, 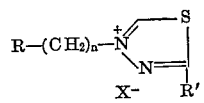, J=7.0), 8.52 (doublet, —CH$_3$, J=7.0).

What is claimed is:
1. A compound of the formula:

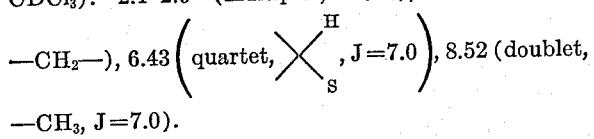

wherein $n$ is an integer from 0 to 1, R is a member selected from the group consisting of H, lower alkyl, lower alkenyl, phenyl, phenyl(lower)alkyl, thiazolyl, furanyl, phenyl substituted with one or more members selected from the group consisting of lower alkyl, lower alkoxy, hydroxy, amino and halogen, and 2-methyl-4-aminopyrimidin-5-yl, R' is a member selected from the group consisting of hydrogen, phenyl, phenyl substituted with one or more members selected from the group consisting of lower alkyl, lower alkoxy, hydroxy, amino and halogen, and 2-methyl-4-aminopyrimidin-5-ylmethyl, and R" is a member selected from the group consisting of lower alkyl, lower alkenyl, phenyl, phenyl(lower)alkyl and phenyl substituted with a member selected from the group consisting of lower alkyl and halogen.

2. A compound according to claim 1, of the formula:

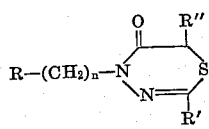

wherein R is a member selected from the group consisting of H, lower alkyl, phenyl and 2-methyl-4-aminopyrimidin-5-yl and R' and R" each is a member selected from the group consisting of H, lower alkyl and phenyl.

3. A compound according to claim 2, namely, 2-phenyl-4,6-dimethyl-5,6-dihydro-4H-1,3,4-thiadiazin-5-one.

4. A compound according to claim 2, namely, 2,6-diphenyl-4-methyl-5,6-dihydro-4H-1,3,4-thiadiazin-5-one.

5. A compound according to claim 2, namely, 4-benzyl-6-phenyl-5,6-dihydro-4H-1,3,4-thiadiazin-5-one.

6. A compound according to claim 2, namely, 2-phenyl-4-benzyl-6-methyl-5,6-dihydro-4H-1,3,4-thiadiazin-5-one.

7. A compound according to claim 2, namely, 2,6-diphenyl-4-benzyl-5,6-dihydro-4H-1,3,4-thiadiazin-5-one.

8. A compound according to claim 2, namely, 4-(2-methyl-4-aminopyrimidin-5-ylmethyl)-6-phenyl-5,6-dihydro-4H-1,3,4-thiadiazin-5-one.

9. A compound according to claim 2, namely, 2,6-diphenyl-4-(2-methyl-4-aminopyrimidin-5-ylmethyl)-5,6-dihydro-4H-1,3,4-thiadiazin-5-one.

10. Process for preparing 1,3,4-thiadiazines which comprises reacting a 1,3,4-thiadiazolium compound of the formula:

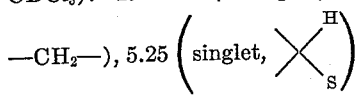

wherein $n$ is 0 to 1, X is an inorganic acid residue, R is a member selected from the group consisting of lower alkyl, lower alkenyl, phenyl, phenyl(lower)alkyl, thiazolyl, furanyl, phenyl substituted with one or more members selected from the group consisting of lower alkyl, lower alkoxy, hydroxy, amino and halogen, and 2-methyl-4-aminopyrimidin-5-yl, and R' is a member selected from the group consisting of hydrogen, phenyl, phenyl substituted with one or more members selected from the group consisting of lower alkyl, lower alkoxy, hydroxy, amino and halogen, and 2-methyl-4-aminopyrimidin-5-ylmethyl, with a member selected from the group consisting of a compound of the formula:

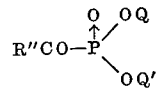

wherein R" is a member selected from the group consisting of lower alkyl, lower alkenyl, phenyl, phenyl(lower)alkyl and phenyl substituted with a member selected from the group consisting of lower alkyl and halogen, and Q and Q' each is member selected from the group consisting of lower alkyl, phenyl and phenyl(lower)alkyl in the presence of an organic or inorganic base in an inert solvent at −100° C. to 40° C. to produce a compound of the formula:

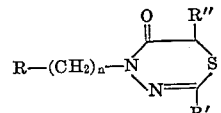

wherein R, R', R" and n each has the same significance as designated above.

11. The process according to claim 10, wherein the base is selected from the group consisting of trialkylamines and pyridine bases.

12. The process according to claim 10, wherein the 1,3,4-thiadiazolium compound is selected from the group consisting of 3-methyl-5-phenyl-1,3,4-thiadiazol-3-ium halides, 3-benzyl-1,3,4-thiadiazol-3-ium halides, 3-benzyl-5-phenyl-1,3,4-thiadiazol-3-ium halides, 3-(2-methyl-4-aminopyrimidin-5-ylmethyl)-1,3,4-thiadiazol-3-ium halides, 3-(2-methyl-4-aminopyrimidin-5-ylmethyl)-1,3,4-thiadiazol-3-ium halide hydrohalides, 3-(2-methyl-4-aminopyrimidin-5-ylmethyl)-5-phenyl-1,3,4-thiadiazol-3-ium halides and 3-(2-methyl-4-aminopyrimidin-5-ylmethyl)-5-phenyl-1,3,4-thiadiazol-3-ium halide hydrohalides.

13. The process according to claim 10, wherein the phosphorus compound is one selected from the group consisting of dialkyl acetylphosphonates and dialkyl benzoylphosphonates.

References Cited

Winthrop et al., Can. J. Chem., vol. 36, pp. 879–82 (1958).

HENRY R. JILES, Primary Examiner

J. M. FORD, Assistant Examiner

U.S. Cl. X.R.

260—256.5, 302, 306.8, 999